A. HOILAND.

AUTOMATIC REVERSIBLE FAN FOR EXPLOSIVE ENGINES.

APPLICATION FILED JAN. 14, 1920.

Reissued Apr. 13, 1920. 14,838.

Fig. II

Inventor:
Albert Hoiland
by: Arnaud Finch
Atty.

UNITED STATES PATENT OFFICE.

ALBERT HOILAND, OF FARGO, NORTH DAKOTA.

AUTOMATIC REVERSIBLE FAN FOR EXPLOSIVE-ENGINES.

14,838. Specification of Reissued Letters Patent. Reissued Apr. 13, 1920.

Original No. 1,304,048, dated May 20, 1919, Serial No. 212,917, filed January 21, 1918. Application for reissue filed January 14, 1920. Serial No. 351,511.

*To all whom it may concern:*

Be it known that I, ALBERT HOILAND, a citizen of the United States, residing at Fargo, in the county of Cass and State of North Dakota, have invented a new and useful Automatic Reversible Fan for Explosive-Engines, of which the following is a specification.

My invention relates to improvements in means for regulating the temperature of radiators and cooling jackets for explosive engines and consists mainly of an automatically operable fan for circulating warm or cold air against or through the radiator or jacket of the engine as may be required to cause the internal combustion engine to operate most efficiently.

My invention further provides means for regulating the temperature and draft of air in the chamber or hood in which the engine of a motor vehicle is usually placed so as to cause warm air to be drawn from about the internal combustion engine and to blow this warm air against the cold radiator when starting the internal combustion engine at a time when the engine and radiator are cold. As the internal combustion engine is operated and becomes warm and reaches a temperature at which it operates most efficiently, my device is adapted to operate automatically to cause the blades of the air circulating fan to be moved into feathering position or into a position to cause cool air to be drawn through the radiator and directed over the internal combustion engine during its operation to keep an even or most desirable temperature in the radiator, engine jacket and about the engine, automatically, regardless of the atmospheric temperature and conditions.

Fig. 4 is a front view of a portion of the radiator.

Figure 1:
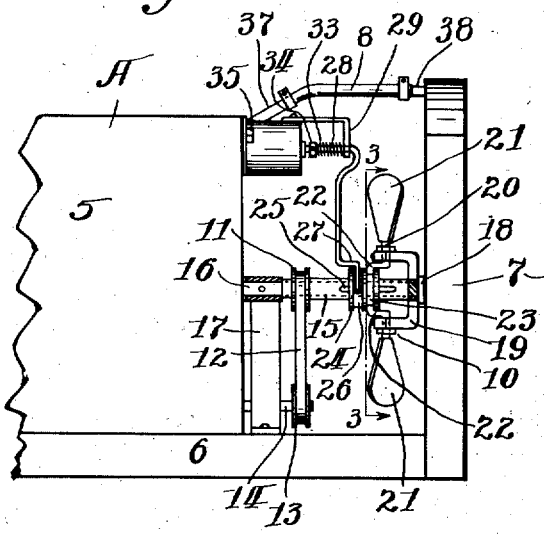
Figure 1 is a side elevation of a portion of an explosive engine and its radiator, illustrating the same diagrammatically as used in automobiles and illustrating my device attached thereto, a portion of which is illustrated in cross section.
Figure 1:
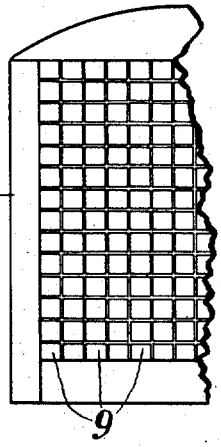
Figure 2:
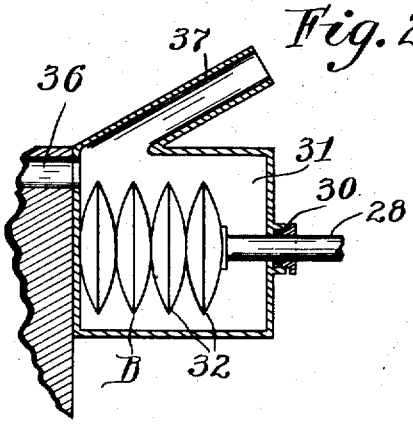
Fig. 2 is an enlarged sectional view of the thermostat employed in my device.
Figure 3:
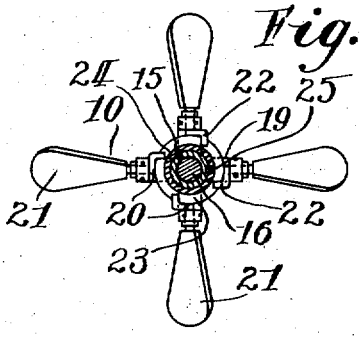
Fig. 3 is a sectional view on the line 3—3 of Fig. 1.

In the drawing A represents an explosive engine which is illustrated only diagrammatically, having a water or cooling jacket 5 with a base 6 and cooling radiator 7, which is connected by the pipe 8 with the water jacket 5 of the engine in the ordinary manner so that a complete circulation is made by the cooling fluid through the water jacket 5 and radiator 7 to keep the engine from overheating while it is in operation. The radiator 7 is of any suitable honeycomb type with interstices 9, through which a current of air is automatically drawn by the cooling fan when the internal combustion engine is in operation. When the engine and radiator form part of a motor vehicle and the same is traveling along the road the movement of the vehicle ahead tends to assist the fan in forcing air through the interstices 9 to cool the liquid in the radiator.

An air circulating fan 10 is positioned between the engine and radiator and is connected to an operating pulley 11, which is driven by a belt 12 from the pulley 13, which is connected in a suitable manner by the shaft 14 to the engine A so that when the engine is operating, the fan 10 will be operated.

The pulley 11 is fixed or formed integral with a sleeve 15 and rotates on the shaft 16, which is rigidly secured in the upper end of the arm 17, while an enlarged head 18 is formed on the outer end of the shaft 16 to retain the sleeve freely rotatable on the shaft 16 between the head 18 and the arm 17. A spider frame 19 is formed on the forward end of the sleeve 15, in the arms of which are journaled short, radially extending shafts 20, each of which carries at its outer end a fan blade 21, while the inner end is formed with a crank arm 22, which engages in the annular groove 23 of the shifting collar 24. The collar 24 is slidably mounted on the sleeve 15 and is engaged by a feather key 25, which causes it to rotate in unison with the sleeve 15.

The shifting or operating collar 24 is formed with an annular groove 26, in which the fork end 27 of an operating arm engages, while the other end of the arm is formed with a rod portion 28, which extends freely through the guide bracket 29, the operating arm being bent to allow it to freely operate the crank arm 22 of the fan blades 21 so that the blades can be turned to blow or draw air away from the internal combustion engine or to draw air through the radiator 7 and blow it toward and against the internal combustion engine. The rod portion 28 of the operating arm extends through a stuffing box 30 of any suitable construction and is connected in a thermostat chamber 31 with a series of thermostat disks 32. The disks 32 form the thermostat B, which is positioned in the chamber 31 and the disks contain suitable fluid for causing them to expand when they are heated and to contract when cooled. A suitable coil spring 33 is positioned on the rod portion 28 of the operating arm and engages against the collar 34 and guide bracket 29 to assist in the operation of the arm when the disks 32 contract when they are cooled.

The thermostat chamber 31 is secured by screws 35 to the water jacket 5 of the internal combustion engine and is formed with a port 36 to receive the cooling fluid into the chamber 31 from the jacket 5, while a suitable nipple 37 is connected with the nipple 38 by the flexible pipe 8 to the upper portion of the radiator 7. Thus the cooling fluid in the jacket 5 and radiator 7 in its course of circulation is brought into direct contact with the thermostat disks 32 to cause the thermostat to operate in accordance with the heat of the internal combustion engine A, and as the thermostat is operated, the fan operating collar 24 is operated, which in turn operates the crank arm 22 to set the blades 21 of the fan in various positions. In this manner the blades 21 of the fan are thermostatically operated automatically in accordance with the heat of the internal combustion engine to set the blades to circulate air in either one direction or the other or to hold the blades in feathering or neutral position, at which point practically no air is circulated by the fan in either direction.

In the operation of internal combustion engines it has proved very essential to maintain an even temperature about the cylinders of the same and thus water and air jackets have been designed, which operate in connection with fans and radiators for the purpose of equalizing or maintaining an even temperature for the internal combustion engine during its operation either in idling or under various loads. My device is designed to automatically regulate to a closer degree the temperature of the internal combustion engine during its operation and instead of the cooling fan drawing air through the radiator openings 9 when the engine A is cold my device is designed to draw the warm air about the internal combustion engine, which is created when it starts, and blow this warm air against the honeycomb cells of the radiator to assist in warming the fluid therein and to bring the internal combustion engine up to a temperature at which it operates most efficiently, as quickly as possible. Instead of drawing cold air through the radiator openings 9 when the engine is cold and is just starting, which would tend to decrease the efficiency of the engine, warm air is directed against the radiator and the cold air is prevented from entering the engine chamber under the hood through the radiator. This feature of my invention is extremely important in the successful operation of automobiles, aeroplanes or other devices using explosive engines. In the course of operation of the internal combustion engine, as the temperature in the cooling jacket rises, the blades 21 of the fan are automatically operated or tilted to turn the fan blades into feathering position and if the temperature continues to rise in the cooling jacket or chamber of the engine, the blades will be shifted beyond feathering position into a position to cause the air to be circulated or drawn through the openings 9 of the radiator and direct a current of air toward the internal combustion engine, either in a more or less degree, to automatically direct a strong or light current of air through the radiator and toward the internal combustion engine. This is also true of the operation of the fan in drawing air away from the internal combustion engine.

The automatic operation of my device in relation to the heat of the internal combustion engine is very essential, as regardless of the atmospheric temperature and conditions in which the internal combustion engine is being operated, my device is designed to automatically regulate the cooling means to keep the internal combustion engine at an even temperature or to bring it as quickly as possible to its most efficient temperature without the attention of the operator or complicated mechanism, which might be apt to get out of order, and warm air drawn from the engine, which is circulated against the radiator in starting the engine when the radiator and engine are cold, will tend to keep the cold air from entering the engine hood or passing through the radiator.

What I claim is:

1. In an explosive engine, a radiator, a cooling fan operatively connected with the engine, said fan having radial wings tiltable about their radial axes, a collar slidable on the shaft of the fan and engaging the wings to tilt them, a thermostat inserted in the water circulation of the engine and radiator and having a thermostatically pushed and pulled rod, a radial arm rigidly fixed on said rod and engaging the collar to slide it on the fan shaft.

2. The structure specified in claim 1, and a spring acting directly on the said rod of the thermostat to assist in the retracting of the rod when the temperature falls.

3. In combination with an internal combustion engine, a radiator, a cooling fan having tiltable blades and thermostatically operated means adapted to tilt the blades of said fan to direct a current of air from or toward said internal combustion engine in a more or less degree or to move said blades into a feathering position, automatically, in relation to the heat of said internal combustion engine.

4. In combination with an internal combustion engine, a cooling radiator and means interposed between said radiator and engine adapted to automatically direct a current of air away from said internal combustion engine and against said radiator or to draw a current of air through said radiator and direct it against said internal combustion engine.

5. A cooling device for an internal combustion engine, comprising an air circulating fan having blades tiltable about their radial axes, means adapted to rotate the blades of said fan collectively and means adapted to automatically tilt said blades during their collective rotation to direct air away from or toward the internal combustion engine in accordance with the heat of said engine.

6. A cooling device for an internal combustion engine, including an air circulating fan and means adapted to automatically operate the blades of said fan during its rotation in accordance with the heat of the internal combustion engine to direct a current of air away from said internal combustion engine toward its radiator, or to direct a current of air toward said internal combustion engine and through its radiator or allow said fan to be rotated with its blades in feathering position.

7. In an explosive engine, a radiator, an air fan having tiltable blades and means adapted to be influenced and operated by the temperature of the cooling medium in said engine and radiator to tilt the blades of said fan in accordance with the temperature of the cooling medium in said engine and radiator to automatically regulate the temperature in said engine and radiator by directing air away from said engine toward said radiator or through said radiator and toward said engine.

8. In an explosive engine having a cooling jacket adapted to receive a cooling medium, a cooling fan having tiltable blades operatively connected with said engine and means adapted to be influenced by the engine cooling medium to operate the blades of said fan to cause air to be drawn away from or brought toward said explosive engine in a more or less degree in accordance with the temperature of the cooling medium and explosive engine.

9. A cooling device for engines, including thermostatically operated means adapted to be influenced by the heat units in said engine and means adapted to be operated by said thermostatical means to direct warm air away from said engine or to direct cool air toward said engine to automatically regulate the temperature in and about said engine for the purposes specified.

10. A cooling device for engines, including means adapted to be automatically operated by the heat of said engine to prevent cold air from being directed against said engine before it has reached a temperature at which it operates most efficiently, said means being also adapted to automatically direct cool air over and about said engine to assist in maintaining an even temperature in and about said engine during its operation.

ALBERT HOILAND.